United States Patent
Blume et al.

[19]

[11] Patent Number: 5,924,854
[45] Date of Patent: Jul. 20, 1999

[54] GEAR PUMP CHANNEL ARRANGEMENT FOR TEMPERING MEDIA

[75] Inventors: Peter Blume, Zürich; Roger Stehr, Bülach, both of Switzerland

[73] Assignee: Maag Pump Systems AG, Switzerland

[21] Appl. No.: 08/795,801

[22] Filed: Feb. 5, 1997

[30] Foreign Application Priority Data

Feb. 9, 1996 [EP] European Pat. Off. ............. 96101866

[51] Int. Cl.$^6$ ........................... F04C 2/18; F04C 15/00; F16C 33/74; F16C 37/00

[52] U.S. Cl. ........................ 418/83; 418/102; 418/104; 418/206.3; 418/206.6; 418/206.7; 384/138; 384/321

[58] Field of Search ............................. 418/83, 102, 104, 418/206.3, 206.6, 206.7, 206.8; 384/138, 144, 321

[56] References Cited

U.S. PATENT DOCUMENTS

| | | | |
|---|---|---|---|
| 2,775,209 | 12/1956 | Albright | 418/102 |
| 3,437,048 | 4/1969 | Noell et al. | 418/206.6 |
| 4,329,128 | 5/1982 | Forgues | 418/206.3 |
| 4,515,512 | 5/1985 | Hertell et al. | 418/102 |

FOREIGN PATENT DOCUMENTS

| | | |
|---|---|---|
| A0090281 | 10/1983 | European Pat. Off. . |
| C349786 | 4/1919 | Germany . |
| B1293022 | 4/1969 | Germany . |
| 4125128 | 2/1992 | Germany ................. 418/104 |
| 264105 | 1/1927 | United Kingdom ........... 384/321 |
| 2202005 | 9/1988 | United Kingdom ........... 418/104 |

*Primary Examiner*—John J. Vrablik
*Attorney, Agent, or Firm*—Evenson, McKeown, Edwards & Lenahan, P.L.L.C.

[57] ABSTRACT

In order to cool the slide bearing area for the slidable bearing of a gear pump shaft, a slide bearing bush with a slide bearing area and, in the case of the guiding-through of a shaft, a sealing area extends in one piece integrally to the outside, and a cooling-medium guiding system provided in the bush is connected from the outside. This eliminates all sealing problems for the cooling medium feeding to the slide bearing area.

9 Claims, 4 Drawing Sheets

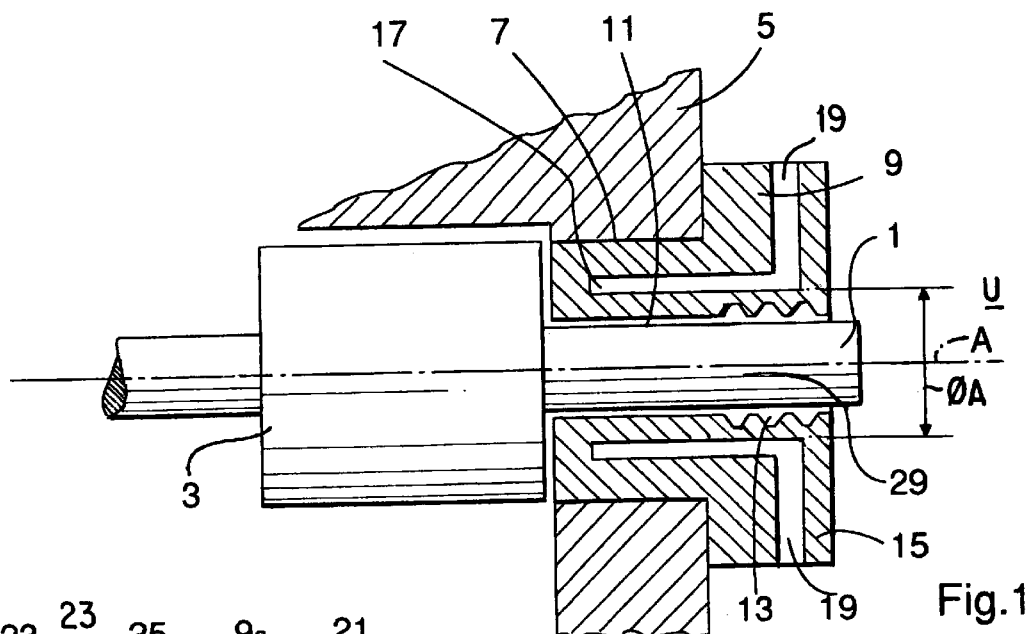
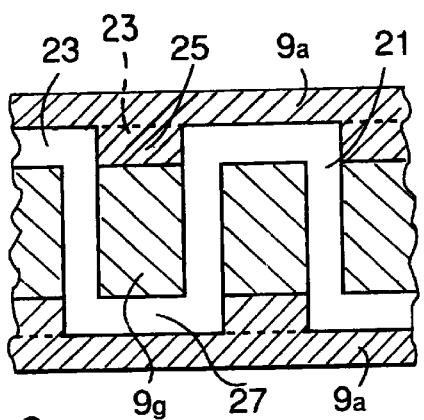
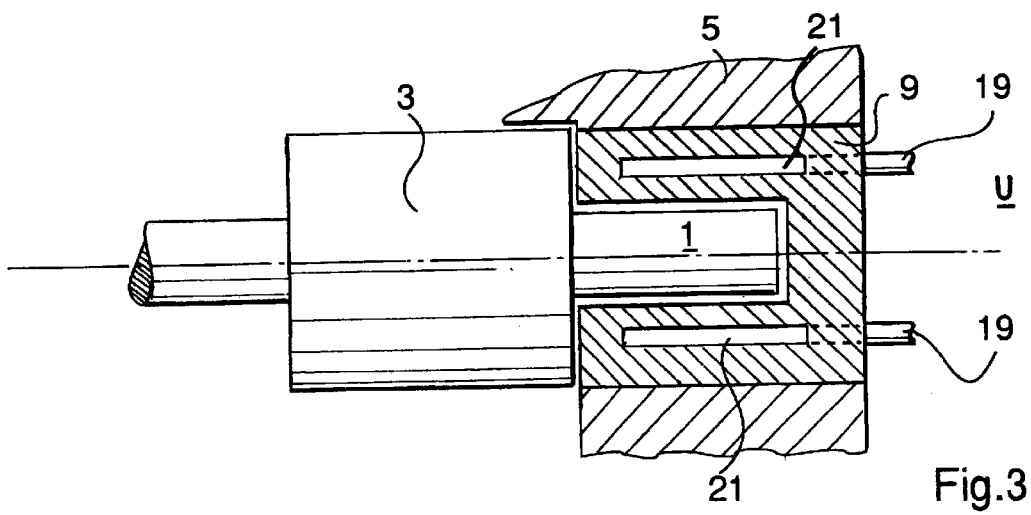

GEAR PUMP CHANNEL ARRANGEMENT FOR TEMPERING MEDIA

BACKGROUND AND SUMMARY OF THE INVENTION

The present invention relates to a gear pump of the type having two rotors, with the shaft of at least one rotor being slidably disposed.

For slidably disposed gear pumps, particularly for Newtonian and intrinsically viscous media, the storage temperature represents a rotational-speed-limiting and therefore throughput-limiting quantity. This is particularly true when the slide bearing is pumping-medium-lubricated. As a rule, this is counteracted by a cooling of the rotor shaft, whereby the operable rotational speed range is expanded. Naturally, it is also possible to cool, instead of the shaft, the slide bearing bush on the pump house side.

However, the problem arises in this case of feeding the coolant flow, or more generally, the tempering medium flow, to the bearing area and removing it again from the bearing area, whether on the shaft side or on the housing side. When the medium is supplied on the housing side, there is the problem that, in the case of bearing bushes, which, for reasons of a simpler axial play adjustment, are arranged within the framework of the manufacturing play relatively loosely in the housing and only in a torsion-resistant manner, the feeding and the removal of the tempering medium must take place by way of tight connection points.

It is an object of the present invention to solve this problem. In the case of a gear pump of the initially mentioned type, this is achieved by means of an arrangement wherein the housing-side slide bearing bush extends in one piece axially to exterior surroundings of the pump and a tempering-medium guiding system is provided in the bearing bush with at least one pair of inlets and outlets which are arranged on the exterior surroundings of the pump.

As a result of the fact that the slide bearing bush extends in one piece axially on or in the surroundings of the pump where the inlets and outlets for a tempering-medium guiding system are provided, the above-mentioned sealing problems are eliminated, and the bearing bushes can be manufactured with respect to the bearing play while following much lower tolerances and therefore at significantly lower prices.

According to especially preferred embodiments, the slide bearing of the pump shaft is pumping-medium-lubricated.

In certain preferred embodiments, the shaft can be guided through the slide bearing into the pump surroundings or the slide bearing bush can be constructed as a closing cover of the shaft bearing bore.

In certain preferred embodiments, the tempering-medium guiding system extends in a meandering fashion along the bearing area of the bearing bush.

Certain preferred embodiments are constructed such that the slidably disposed shaft is guided through into the surroundings and a sealing area, preferably constructed as a labyrinth seal area, adjoins the slide bearing area on the slide bearing bush. In this case, the labyrinth seal may be worked either into the slide bearing bush and/or into the shaft.

In certain preferred embodiments, the slidably disposed shaft is guided through to the outside and preferably merges in one piece into a projecting mounting flange with or without a passage bore for the shaft.

So that, in the case of a pumping-medium-lubricated slide bearing, the lubricating flow can be returned into the pumping current of the gear pump, an essentially radially directed bore is provided through the bush and is connected with the delivery space of the pump in preferred embodiments of the invention.

In most cases, not only one of the rotors is slidably disposed on one side as indicated, but both rotors, at least on one side. Normally, the rotors will be slidably disposed on both sides in the same manner. In this case, it is suggested according to preferred embodiments that, at least on one side, both shafts of the rotors are disposed in one of the above-mentioned bearing bushes respectively which mutually secure one another with respect to torsion.

If the slide bearings are pumping-medium-lubricated, the above-mentioned return bores, which are directed essentially radially through the bearing bushes, are provided according to preferred embodiments on the two bearing bushes in such a manner that they lead into one another and communicate jointly with the pump delivery space. In especially preferred embodiments an arrangement is provided, wherein the two bearing bushes rest against one another along essentially plane, axially parallel surfaces between the shafts and the essentially axially parallel conduit to the pump delivery space is formed by grooves which are each machined into the surfaces.

Other objects, advantages and novel features of the present invention will become apparent from the following detailed description of the invention when considered in conjunction with the accompanying drawings.

BRIEF DESCRIPTION OF THE DRAWINGS

FIG. 1 is a schematic cross-sectional view of the slide bearing area of a gear pump constructed according to a preferred embodiment of the invention, where the shaft is guided through into the surroundings;

FIG. 2 is a schematic developed view of the slide bearing bush provided according to the invention for explaining a preferred embodiment of the provided tempering-medium guiding system;

FIG. 3 is a schematic representation analogous to FIG. 1 of another embodiment of the invention with the shaft slidably disposed on a gear pump but is not guided through;

DETAILED DESCRIPTION OF THE DRAWINGS

Figure 2A:
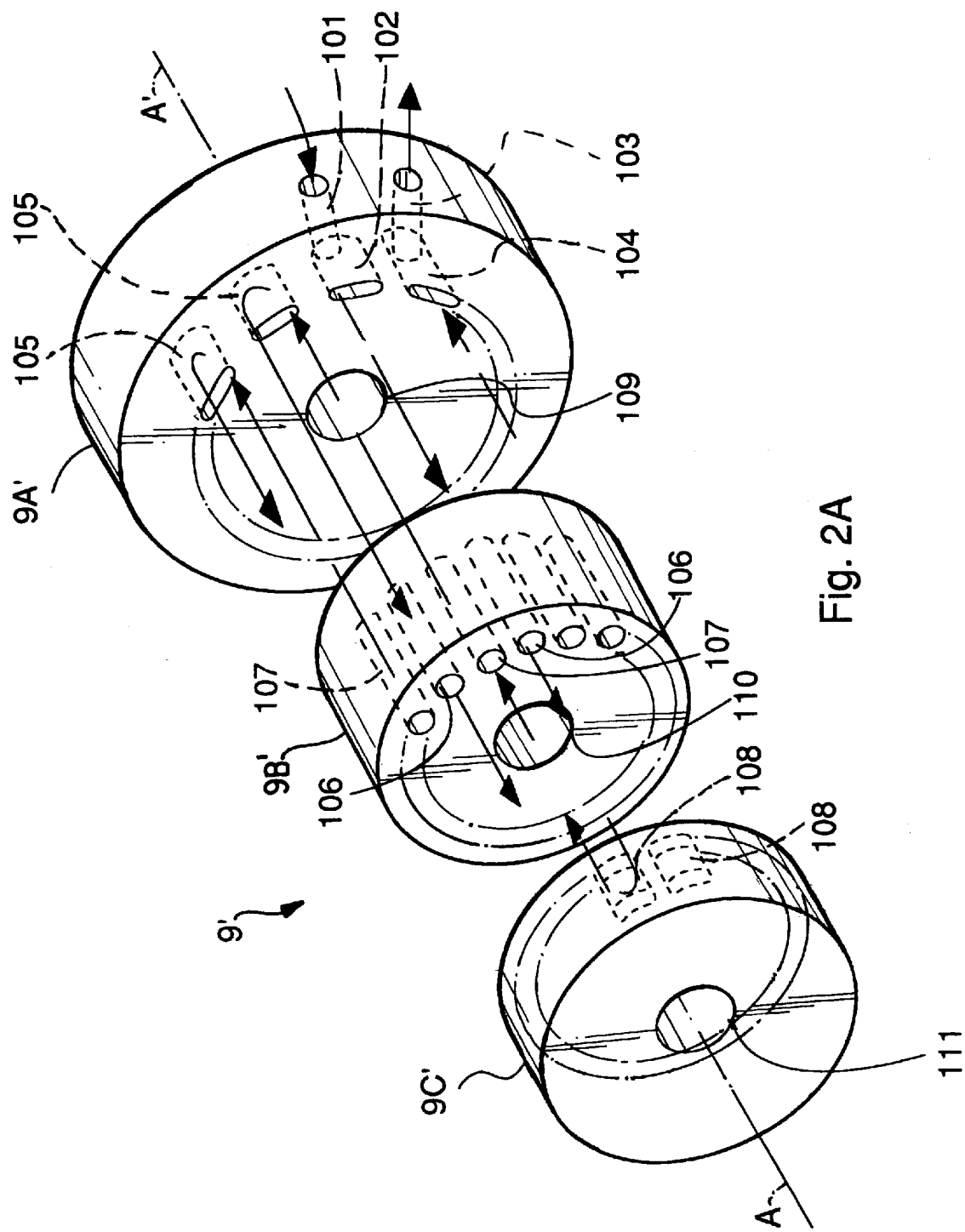
FIG. 2A is an exploded schematic view showing a preferred form of construction of a slide bearing bush constructed according to a preferred embodiment.

According to FIG. 1, the shaft 1 of a gear rotor 3 of a gear pump according to the invention extends through the housing 5. A slide bearing bush 9 is disposed in the passage bore 7 of the housing. Its bore has a bearing area 11 as well as a sealing area 13 which, as illustrated, is preferably constructed as a labyrinth seal area. The slide bearing bush 9 communicates in one piece with the pump surroundings U. In the embodiment illustrated in FIG. 1, a flange 15 situated on the end is molded to the bush 9, which flange (in a manner which is not shown) is detachably connected with the housing 5 and may, for example, be bolted to it. Particularly along the bearing area 11, a tempering-medium guiding system 17 is provided in the slide bearing bush 9 and has feeding and removal connections 19 in the surroundings U for the tempering medium. Thus, the slide bearing bush 9 at the same time also forms covers for the shaft passage.

FIG. 2 is a schematic developed view of a portion of a bearing bush 9 showing an embodiment with a meandering tempering-medium guiding system and corresponds to a section of the cylindrical sectional surface $\phi_A$ of the bearing bush 9 of FIG. 1.

As illustrated in FIG. 2, the bearing bush 9 consists of a basic body $9_g$ and two annular closing plates $9_a$. First, through-bores 21 are drilled through the basic body and, on the front side of the basic body $9_g$, for example, one surrounding ring-shaped groove 23 respectively is drilled which connects the respective mouths of the bores 21. Then the end plates are fitted on and are, for example, welded to the basic body $9_g$. They alternately, as illustrated in FIG. 2, in each case close off the connecting groove between two adjacent bores 21, as illustrated in area 25, or leave the connecting groove open, as illustrated in area 27 so that, in a constructively simple manner, a meandering guiding system is created along particularly the sealing area 11 of the slide bearing bush 9.

FIG. 2A is an exploded view of a preferred embodiment of a bearing bush 9' which is constructed of three basic parts 9A', 9B' and 9C'. Part 9A' is a cylindrical large diameter part which contains a radially extending tempering medium inlet opening 101 drilled radially into and communicating with an inlet chamber 102. Inlet chamber 102 is machined in from the left side of part 9A'. The part 9A' also includes a radially drilled outlet bore 103 which communicates with an outlet chamber 104 machined into the left side face of the part 9A'. The part 9A' also includes medium fluid turnaround chambers 105 dispersed around the central axis A–A' which are machined in from the left side face. This axis A–A', in an in use assembled condition of the bushing 9', corresponds to the axis A of FIG. 1.

Part 9B' is a cylindrical member which includes axially extending bores 106, 107 which serve in use respectively as inlet bores and outlet bores for the tempering medium.

The part 9C' includes turnaround chambers 108 distributed around the axis A–A' and correspond in number to one-half of the number of the radial bores 106, 107 of part 9B', with respective inlet and outlet bores leading to each of these chambers 108.

Each of the parts 9A', 9B' and 9C' have respective axially extending central bores 109, 110 and 111 which are dimensioned to bearingly support the shaft of the gear pump in the assembled condition.

After the parts 9A', 9B' and 9C' have been machined and drilled with the indicated pattern of tempering medium guiding bores and chambers, they are aligned and connected to one another along their facing end surfaces by welding to form a unitary bearing bush construction with a temporary medium guiding system which provides for a meandering flow of the medium along the length thereof. FIG. 2A includes arrows depicting fluid flow. It should be understood that FIG. 2A only schematically depicts the pattern for the chambers and bores, the number, size and disposition to be selected depending on the tempering fluid flow desired. For example, the axially extending bores 106, 107 could be relatively larger and closed relatively closer to the central bores so as to increase the tempering effect when in an in use position in the gear pump. This FIG. 2A construction is advantageous in facilitating the manufacture without complex machining operation.

Figure 6:
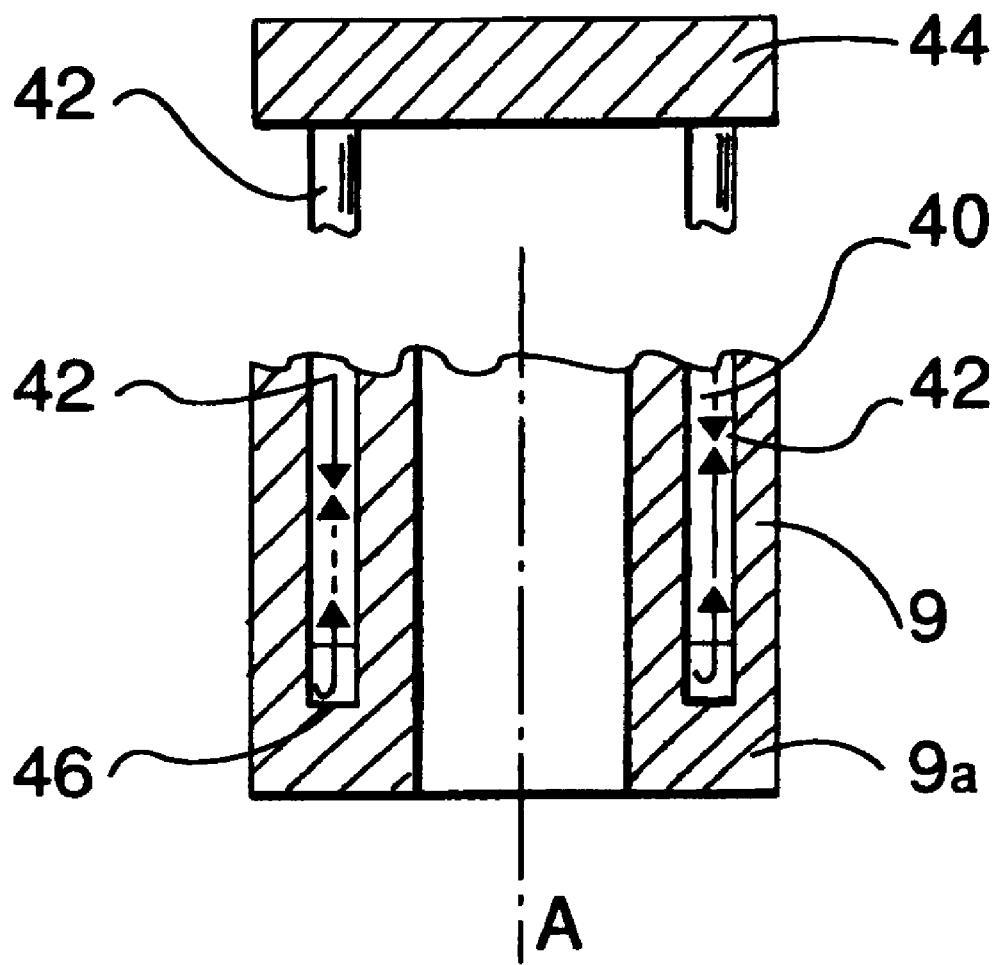
FIG. 6 is a cross-sectional view of a slide bearing bush provided on the gear pump according to the invention with an integrated meandering temperature-medium guiding system.

Another possibility of providing a meandering guiding system for the tempering medium on the slide bearing bush of the gear pump according to the invention is schematically illustrated in FIG. 6. In contrast to the embodiment illustrated in FIGS. 2 and 2A, this embodiment has the important advantage that no weld connection seams must be provided on the frontal side of the bush facing the delivery space. According to FIG. 6, pocket bores 40 are drilled in a regularly spaced manner and in parallel to the axis A into the bearing bush 9 from the end face facing away from the delivery space. From the end face facing away from the delivery space, metal plates 42 are then embedded in the pocket bores 40 and are fastened to an end face plate 44. In that the metal plates 42 are dimensioned such that they leave a passage open in the base area 46 of the pocket bores, by means of these metal plates 42 the pocket bores 40 are each divided into two ducts which communicate in the base area 46. On the side of the bush 9 facing away from the delivery space of the pump, plate 44, in turn, is welded to the base body 9a.

The slide bearing bush of the type shown in FIG. 1 can also form the closed end cover for the bearing of a shaft which is not guided through. Then the sealing area and the passage bore in the slide bearing bush will be eliminated.

In contrast to the embodiment according to FIG. 1, in the embodiment according to FIG. 3, the shaft 1 is not guided through into the surroundings. As in the embodiment according to FIG. 1, however, the slide bearing bush 9 is now constructed without any sealing area in one piece and communicates with the surroundings U, where the connections 19 for the tempering-medium guiding system with the bores are arranged.

In the embodiment according to FIG. 1 as well as in that according to FIG. 3, the slide bearings are normally pumping-medium-lubricated. In order not to have to accept any pumping flow loss, in the bush 9 according to FIG. 4, when the shaft 1 is guided through into the surroundings following the slide bearing area 11, an essentially radially directed bore 30 is provided through the bush 9 which, by way of a connection conduit 31 in the housing 5 of the pump, communicates with the delivery space P of the pump, particularly with its low-pressure side.

In order to, in the process, as illustrated by means of the arrow F, optimally ensure the return of the pumping medium used as the lubricating medium, a ring groove 32 is machined into the bush 9 in the area of the bore 13.

Figure 4:
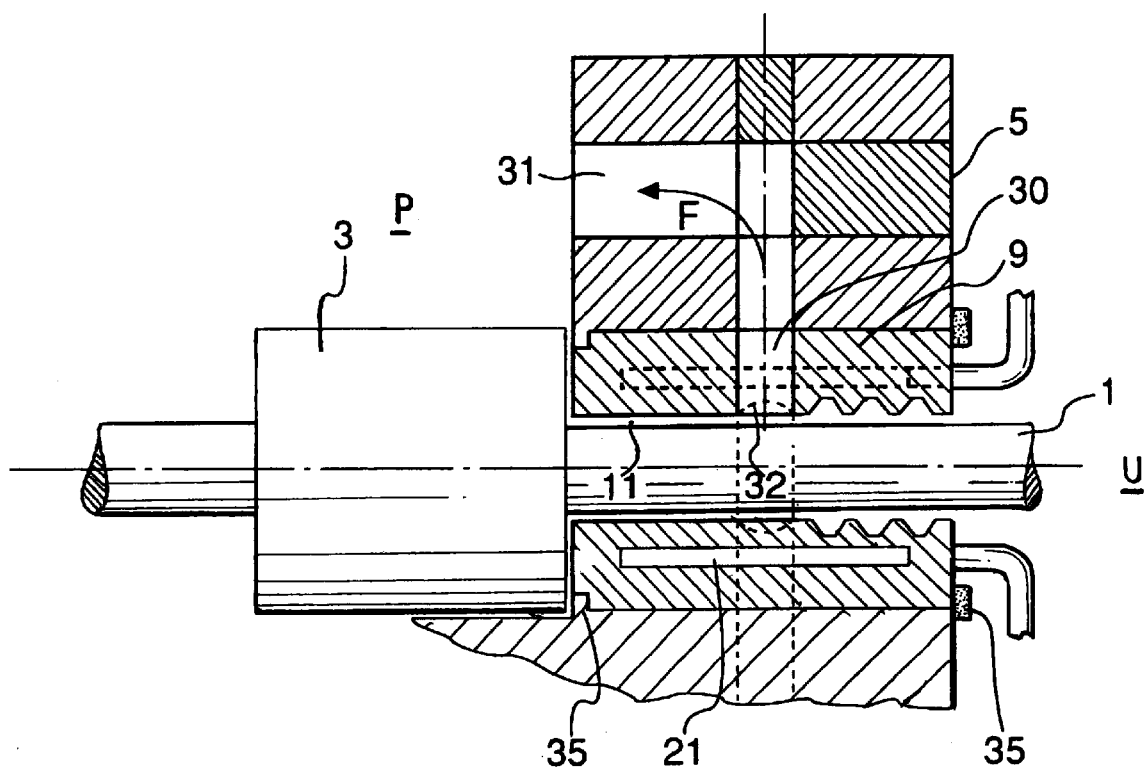
FIG. 4 is an analogous representation of another embodiment of the shaft slide bearing on a gear pump according to the invention.

In the embodiments according to FIG. 3 and 4, in which the slide bearing bush 9 provided according to the invention is constructed with an integrated tempering-medium guiding system without an end flange or end cover, as the result of the corresponding shaping of the exterior surface of the slide bearing bushes 9, a resistance to torsion is achieved and, as illustrated schematically in FIG. 4 at reference number 35, the axial holding is achieved by means of simple tension jacks and a stop-type guiding of the slide bearing bushes 9.

Figure 5:
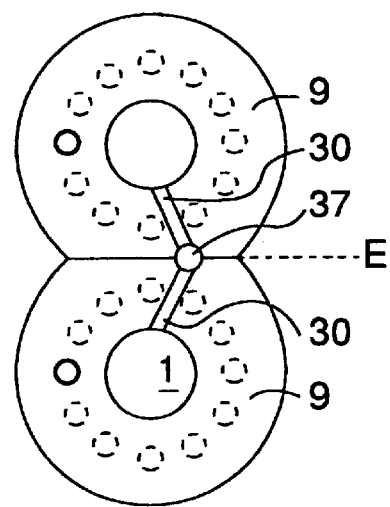
FIG. 5 is a schematic top view of the arrangement of two slide bearing bushes provided according to the invention for the slidable disposing of the one-sided shafts of both gear rotors in the case of pumping-medium-lubricated slide bearings.

If, at least on one side, the shafts of both gear rotors are to be slidably disposed according to the invention, particularly by means of pumping-medium-lubricated slide bearings, this is preferably implemented as illustrated schematically in FIG. 5. By means of a flattening of the slide bearing bushes 9, essentially along a plane E between the shafts 1, the torsion resistance of the two bushes 9 is achieved. The bores 30, which are provided for returning the lubricating flow and are directed essentially in the radial direction, are jointly guided in a return duct 37 which is implemented by the machining-in of essentially axially parallel grooves in each case into the two adjoining plane surfaces of the respective slide bearing bushes 9. Naturally, in the case illustrated in FIG. 1, one slide bearing bush 9 is normally constructed as a passage for the shaft 1 and the other slide bearing bush is constructed according to FIG. 3 as a bearing end body.

By means of the gear pump according to the invention, the cooling, particularly of the slide bearing area, of a slidably disposed gear rotor shaft on a gear pump is achieved in a simple manner without the requirement of solving any sealing problems. The guiding system on the slide bearing bush 9 is connected directly from the outside to a delivery assembly (not shown) for a tempering medium, normally a cooling medium. In this case, tolerances with respect to the axial seat of the bearing bushes in the housing become insignificant with respect to the sealing off of the tempering guiding system.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Gear pump, comprising:

a housing; two meshing rotors, at least one rotor having a shaft extending axially towards a lateral surface of said housing exposed to ambient surroundings, a journal bearing rigidly mounted in said housing and having at least one bushing in which said shaft is operatively arranged, means axially holding said at least one bushing in said housing, said at least one bushing having an outer surface configured to allow said at least one bushing to be slidably axially extractable from said housing after release of said holding means, said bushing comprising an end face adjacent to said lateral surface of said housing also exposed to the ambient surroundings, a channel arrangement within said bushing and extending axially along and around said bushing, and at least one inlet and at least one outlet for said channel arrangement provided at said end face of said bushing for respectively introducing and removing a tempering medium to and from said channel arrangement.

2. Gear pump according to claim 1, wherein the channel arrangement extends in a meandering configuration along a bearing area of said bushing.

3. Gear pump according to claim 1, wherein said bushing has a delivery-space-side slide bearing area and a sealing area which adjoins, axially toward the ambient surroundings, a labyrinth sealing area.

4. Gear pump according to claim 1, wherein the shaft is guided through the bushing into pump surroundings.

5. Gear pump according to claim 1, wherein the bushing is pumping-medium-lubricated, and an axial flow path for pumping medium is provided between said shaft and the bushing.

6. Gear pump according to claim 5, wherein progressing from the delivery space toward the outside, following a bearing area of said bushing, at least one essentially radially directed bore through said bushing communicates with a delivery space for returning slide bearing lubricating flow into the delivery space.

7. Gear pump according to claim 1, wherein the at least one journal bearing bushing is two bushings and at least on one side, the rotors have shafts disposed in one of the bushings respectively which secure one another with respect to torsion.

8. Gear pump according to claim 7, wherein progressing from a pump delivery space toward the ambient surrounding, following bearing areas of the bushings, one essentially radially directed bore respectively is provided in the bushing, which bores lead into one another and together are connected with the pump delivery space by way of a essentially shaft-axis-parallel conduit.

9. Gear pump according to claim 8, wherein the bushings rest against one another along essentially plane, axially parallel surfaces between the shafts, and the essentially axially parallel conduit to the pump delivery space is formed by grooves machined into the axially parallel surfaces.

* * * * *